Patented Mar. 6, 1945

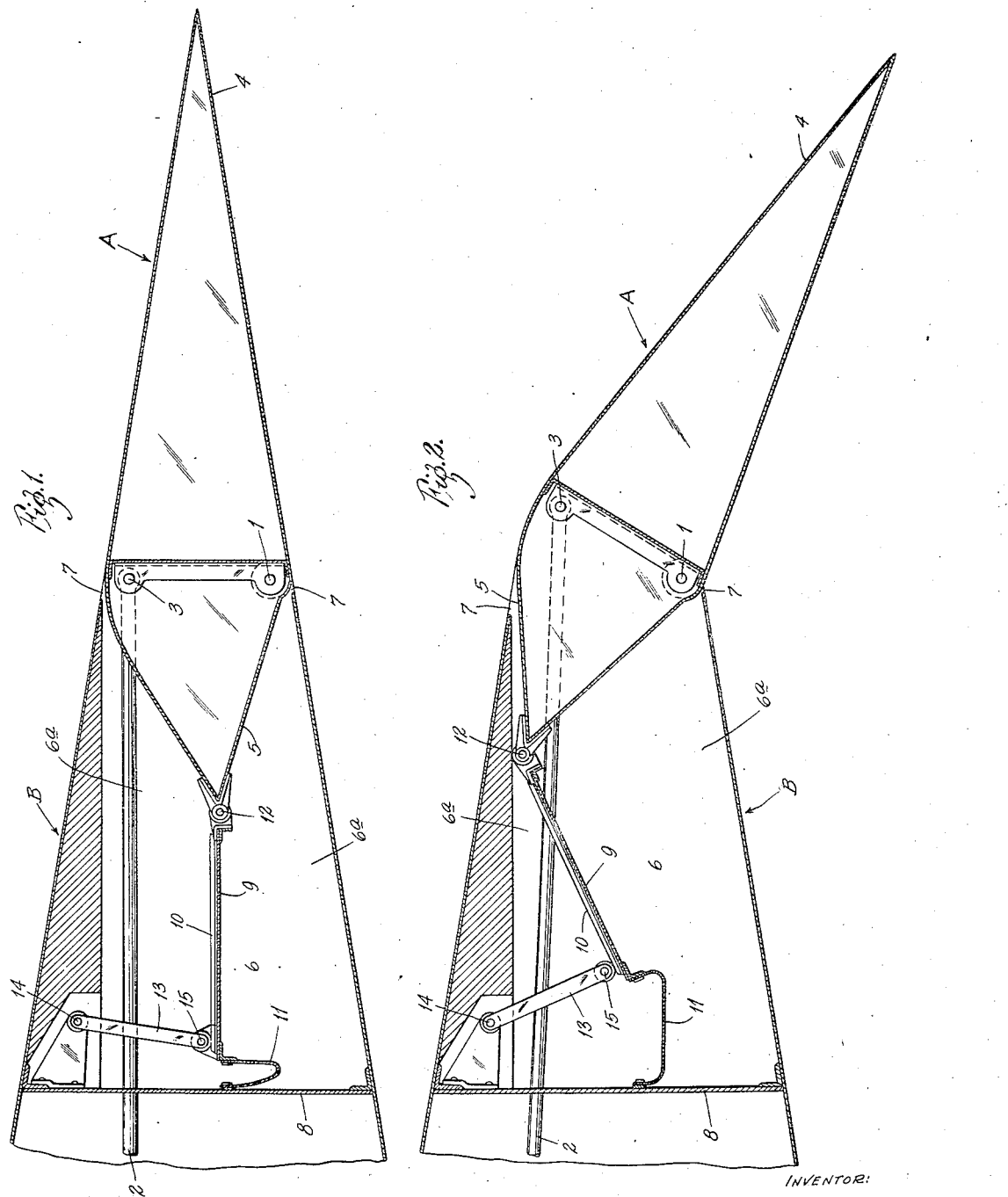

2,370,893

UNITED STATES PATENT OFFICE 2,370,893

CONTROL SURFACE FOR AIRPLANES

Albert Utsch, Normandy, Mo., assignor to McDonnell Aircraft Corporation, St. Louis, Mo., a corporation of Maryland Application March 6, 1943, Serial No. 478,197

2 Claims. (Cl. 244—90)

This invention relates to airplanes, more particularly to movable airfoils, such as ailerons that are internally aerodynamically balanced by means of a flexible sealing member that connects the nose portion of the aileron with the forward wall of a rearwardly opening housing provided therefor in the fixed wing structure and has sufficient slack to permit maximum tilting movement of said aileron. The invention has for its object to decrease the length of the above flexible sealing member and thus overcome the tendency thereof to become knotted and tangled and rendering the aileron inoperative in the neutral position thereof and, at the same time, to provide the proper internal aerodynamic balance of the aileron without weakening the fixed wing structure and without reducing the tilting movement of the aileron. Other objects are simplicity and economy of construction and compactness of design. The invention consists in the improved seal connection between the nose portion of the aileron and the forward wall of the housing provided for said nose portion in the fixed wing structure; and it also consists in the construction, arrangements and combinations of parts hereinafter described and claimed.

In the accompanying drawing, which forms part of this specification and wherein like symbols refer to like parts wherever they occur, Fig. 1 is a cross-sectional view illustrating my invention embodied in an internally aerodynamically balanced aileron of an airplane wing, the aileron being shown in neutral position; and Fig. 2 is a view similar to Fig. 1, showing the aileron in tilted position.

In the accompanying drawing an internally balanced auxiliary airfoil in the form of a hollow aileron A is shown hingedly connected by a horizontal pivot 1 to the lower corner of the trailing edge of a fixed airfoil in the form of an airplane wing structure B of any desired profile. The aileron A is adjustable about its pivotal axis 1 to vary the angular position thereof relative to the fixed wing structure B by means of a push-and-pull control rod 2 that is pivotally secured, as at 3, to said aileron and extends forwardly to a point (not shown) where it may be conveniently actuated by the pilot.

The aileron A has a relatively long trailing edge portion 4, which tapers rearwardly from the hinge axis 1 and is faired into the upper and lower contours of the fixed wing structure B to form a continuation thereof, and a relatively short nose portion 5, which lies forward of said hinge axis and is disposed in a suitably formed rearwardly opening housing or pocket 6 provided therefor in the trailing edge of said wing structure. Vertical spaces or slots 7 are provided between the nose portion 5 of the aileron A and the rear edges of the housing or pocket 6 in the wing structure B; and said nose portion terminates a considerable distance short of the vertical front wall 8 of said housing or pocket to permit a maximum tilting movement of said aileron relative to said wing structure.

Located in the rearwardly opening housing 6 in the wing structure B is a floating internally aerodynamic balanced bulkhead or partition, which connects the forward edge of the nose portion 5 of the aileron A with the forward wall 8 of said housing and divides the latter into upper and lower chambers 6a that communicate with the upper and lower surfaces of said aileron through the slots 7, whereby the exterior air pressures are balanced by the equal air pressures in the two chambers. Said floating bulkhead or partition comprises a thin, light-weight metal plate 9, which is stiffened and strengthened at intervals by angles or other members 10, and a rubberized fabric seal or membrane 11. The plate 9 has a hinge connection 12 along its rear edge with the front edge of the nose portion 5 of the aileron A. The other or forward edge of the plate 9 terminates adjacent to the forward wall 8 of the housing 6 of the wing structure B and is movably connected to said wall by the fabric seal 11, which is connected along one margin to the front edge of said plate and along the opposite margin to said wall and has sufficient slack to permit maximum tilting movement of said aileron within the limits defined by the top and bottom surfaces of said housing. The plate 9 is suspended adjacent to its forward or free end in the housing 6 of the wing structure B for bodily movement with the nose portion 5 of the aileron A preferably by means of one or more hanger links 13 that have their upper ends pivotally anchored, as at 14, in said structure above said housing and have their lower ends pivotally connected, as at 15, to said end of said plate, whereby said plate is adapted to shift bodily in said housing and change its angular position therein in response to the tilting movement of said nose portion of said aileron.

The hereinbefore described arrangement provides a simple and easily operable internally aerodynamically balanced aileron construction, which permits maximum tilting movement of the aileron without resorting to differential control surfaces and without weakening the fixed wing structure on which the aileron is hingedly supported. The rigid plate 9 constitutes the greater portion of the aerodynamic balance section of the aileron and is free to float in the housing 6 of the wing structure B and follow the movements of the nose portion 5 of the aileron A, while the fabric sealing strip 11 is relatively narrow and thus cannot become knotted and tangled and interfere with the tilting movement of the aileron; and the plate supporting links 13 serve to relieve said fabric strip of the weight of said plate and the pressure of the air thereon.

Obviously, the hereinbefore described construction admits of considerable modification without departing from the invention. Therefore, I do not wish to be limited to the precise arrangements shown and described.

What I claim is:

1. In an airplane, the combination with a fixed wing structure having a rearwardly opening housing therein and an aileron hingedly connected to the trailing edge of said wing structure, said hinge connection comprising a horizontally disposed pivotal connection for hingedly connecting said aileron to the lower portion of the trailing edge of said fixed wing structure opening, said horizontal pivotal connection being housed within said aileron adjacent the lower portion thereof, control means secured to said aileron adjacent the upper portion thereof for manually pivoting said aileron relative to said fixed wing structure, said aileron having a nose portion lying forward of its hinge axis and having a substantial portion thereof disposed within said housing, and means floatably mounted within said fixed wing structure for internally aerodynamically balancing said aileron comprising a substantially rigid plate member disposed in said housing clear of the front wall thereof, a link pivotally connected at one end to the upper portion of said fixed wing structure and pivotally connected to the forward portion of said substantially rigid plate member thereby permitting the forward portion of said plate to float in a fixed arcuate path, a hinge connection between said nose portion and the rear edge of said plate permitting said aileron to rock about said horizontal pivotal connection and the rear portion of said plate to float in a fixed arcuate path, and a flexible member connecting the front edge of said plate to said interior surface of said wing structure and having sufficient slack to permit maximum rocking movement of said aileron.

2. In an airplane, the combination of a fixed wing structure having a rearwardly opening housing therein and an aileron hinged and faired to said wing structure, said hinge connection comprising a horizontally disposed pivotal connection for hingedly connecting said aileron to the lower portion of the trailing edge of said fixed wing structure opening, said horizontal pivotal connection being housed within said aileron adjacent to the lower portion thereof, control means secured to said aileron adjacent the upper portion thereof for manually pivoting said aileron relative to said fixed wing structure, said aileron having a nose portion lying forward of the hinge axis thereof and having a substantial portion thereof disposed within said housing, and a floating bulkhead connection between said nose portion and the forward wall of said housing forming internal aerodynamic balance chambers in said housing above and below said bulkhead, said bulkhead comprising a substantially rigid plate member hingedly connected along its rear edge to said nose portion of said aileron permitting said aileron to rock about said horizontal pivotal connection and the rear portion of said plate to float in a fixed arcuate path, a link pivotally connected at one end to the upper portion of said fixed wing structure and pivotally connected to the forward portion of said substantially rigid plate member thereby permitting the forward portion of said plate to float in a fixed arcuate path, and a flexible member sealing the front edge of said plate to said forward wall of said housing and having sufficient slack to permit maximum tilting movement of said aileron.

ALBERT UTSCH.